United States Patent
Sierra

(10) Patent No.: US 12,486,871 B2
(45) Date of Patent: Dec. 2, 2025

(54) ROLLING BEARING WITH DISCHARGE ELEMENT

(71) Applicant: Schaeffler Technologies AG & Co. KG, Herzogenaurach (DE)

(72) Inventor: Kleberson Sierra, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 86 days.

(21) Appl. No.: 18/605,363

(22) Filed: Mar. 14, 2024

(65) Prior Publication Data
US 2025/0290549 A1    Sep. 18, 2025

(51) Int. Cl.
| | |
|---|---|
| *F16C 19/06* | (2006.01) |
| *F16C 19/52* | (2006.01) |
| *F16C 33/38* | (2006.01) |
| *F16C 41/00* | (2006.01) |

(52) U.S. Cl.
CPC ............ *F16C 41/002* (2013.01); *F16C 19/06* (2013.01); *F16C 19/52* (2013.01); *F16C 33/3837* (2013.01); *F16C 2380/26* (2013.01)

(58) Field of Classification Search
CPC ...... F16C 19/06; F16C 19/52; F16C 33/3837; F16C 33/3843; F16C 33/385; F16C 33/3856; F16C 33/3862; F16C 33/3868; F16C 33/3875; F16C 41/002; F16C 2380/26
See application file for complete search history.

(56) References Cited

U.S. PATENT DOCUMENTS

| | | | |
|---|---|---|---|
| 6,142,673 A | 11/2000 | Kottritsch et al. | |
| 7,136,271 B2 | 11/2006 | Oh et al. | |
| 7,528,513 B2 | 5/2009 | Oh | |
| 8,169,766 B2 | 5/2012 | Oh et al. | |
| 8,199,453 B2 | 6/2012 | Oh et al. | |
| 9,464,672 B2 | 10/2016 | White | |
| 2017/0152891 A1 * | 6/2017 | Kawamura | ......... F16C 33/6633 |
| 2020/0080597 A1 | 3/2020 | White et al. | |

(Continued)

FOREIGN PATENT DOCUMENTS

| | | | |
|---|---|---|---|
| DE | 102020118687 A1 * | 1/2022 | .......... F16C 33/3806 |
| DE | 102022002744 A1 * | 9/2022 | ............ F16C 41/002 |
| JP | H10252745 A * | 9/1998 | ............ F16C 41/002 |

(Continued)

*Primary Examiner* — Phillip A Johnson
(74) *Attorney, Agent, or Firm* — Suiter Swantz IP

(57) ABSTRACT

Rolling bearings may include outer and inner rings defining races, rolling elements which maintain rolling contact between the races, a cage holding the rolling elements, and discharge elements. The cage may include cage-halves which are joined together. The cage-halves may define semi-circle portions which hold the rolling elements and to which the discharge elements are fixed and may also define rib portions. The cage may also be monolithic and define rib portions to which the discharge elements are fixed and major-arc portions which may hold the rolling elements by a press-fit. The discharge elements may include tubes which are fixed to the semi-circle portions and/or the rib portions. The discharge elements may also include filaments which may extend from the cage and contact the outer and inner rings. The rolling bearings may join a stator and rotor of an electric motor.

20 Claims, 13 Drawing Sheets

(56) References Cited

U.S. PATENT DOCUMENTS

2020/0263734 A1 8/2020 Kottapalli et al.
2022/0018399 A1 1/2022 Ince et al.

FOREIGN PATENT DOCUMENTS

| JP | H10252746 A * | 9/1998 | ............ F16C 33/427 |
| WO | WO-2009052798 A1 * | 4/2009 | .............. F16C 33/46 |
| WO | 2016171929 A1 | 10/2016 | |

* cited by examiner

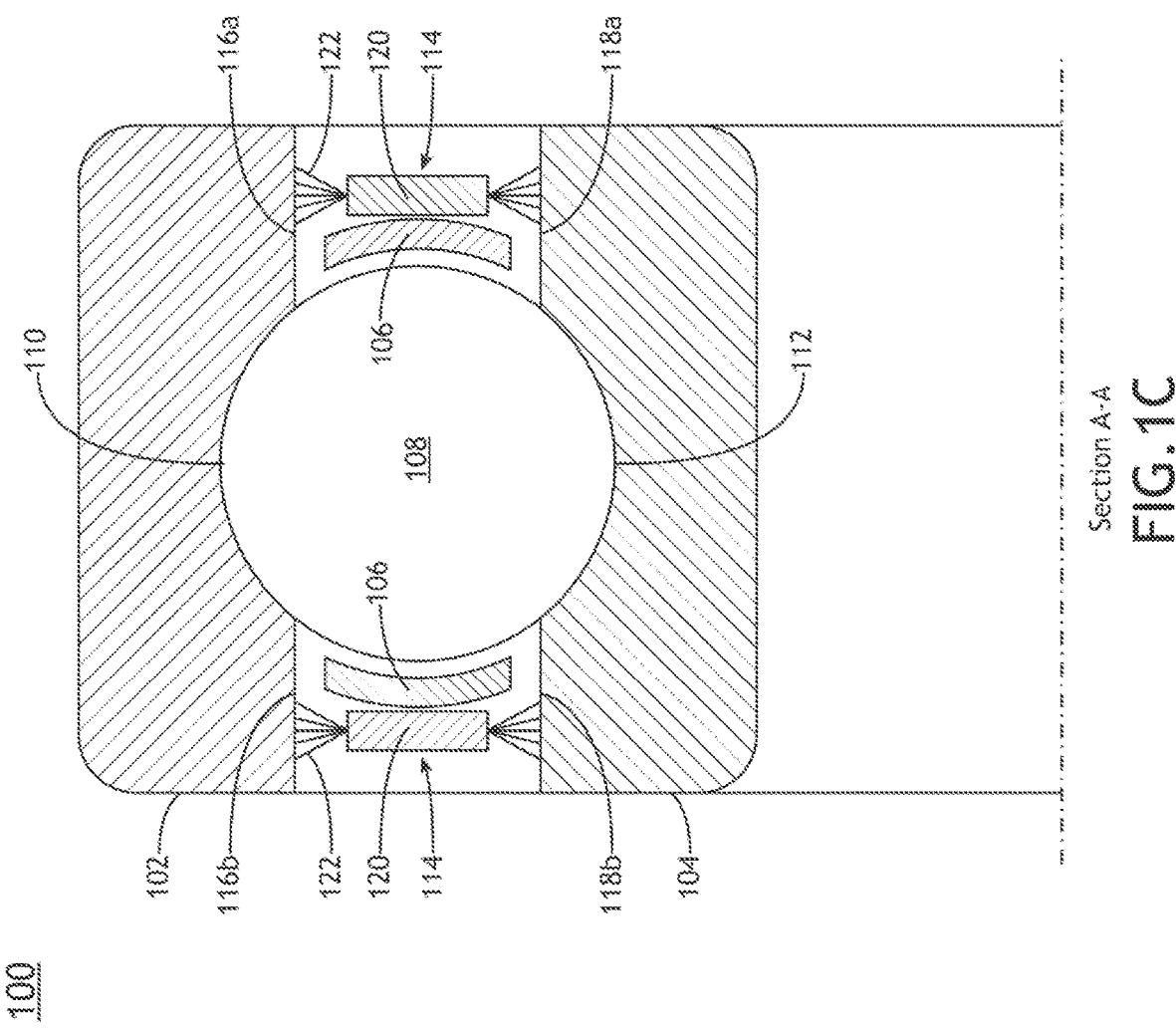

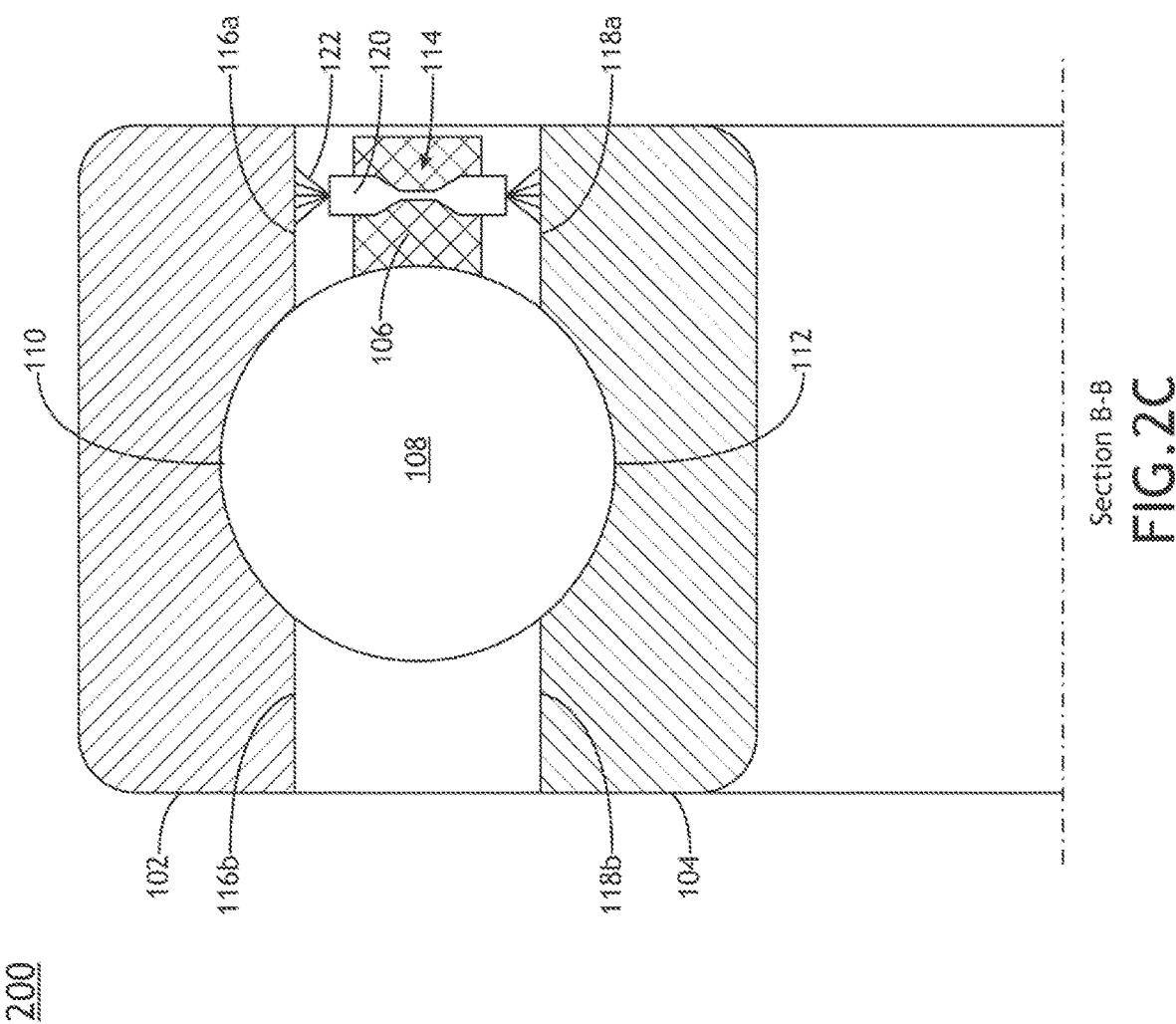

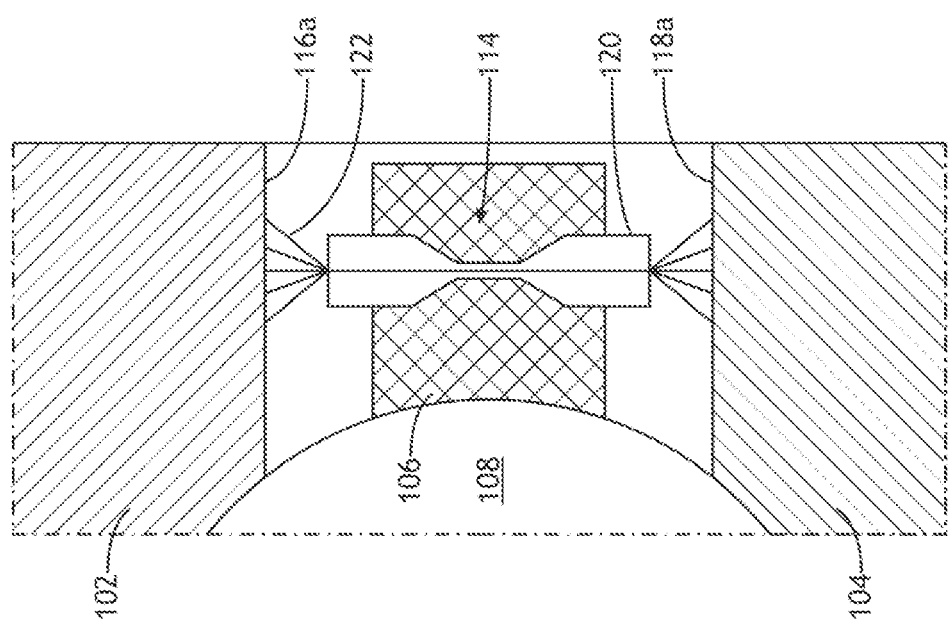

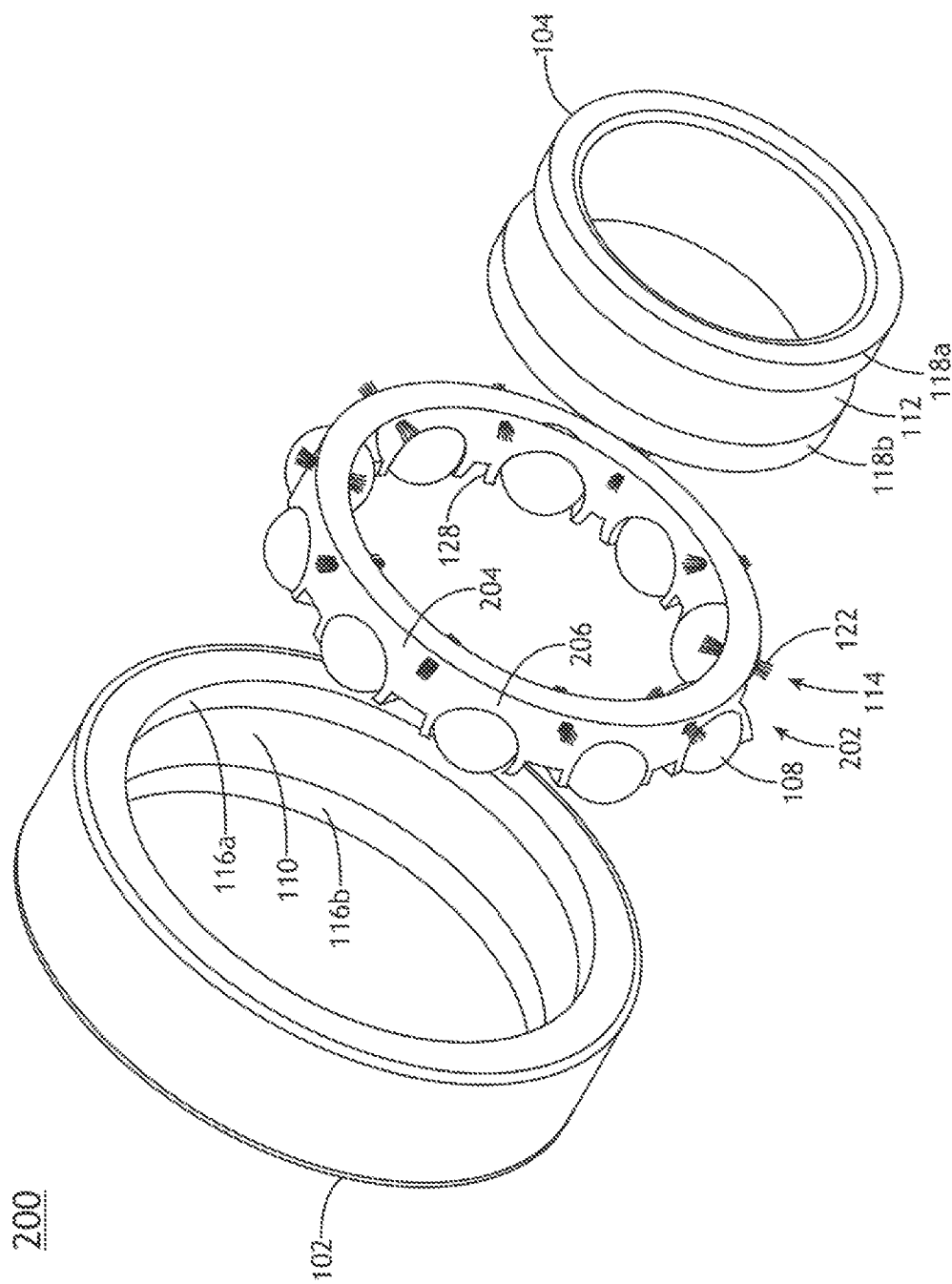

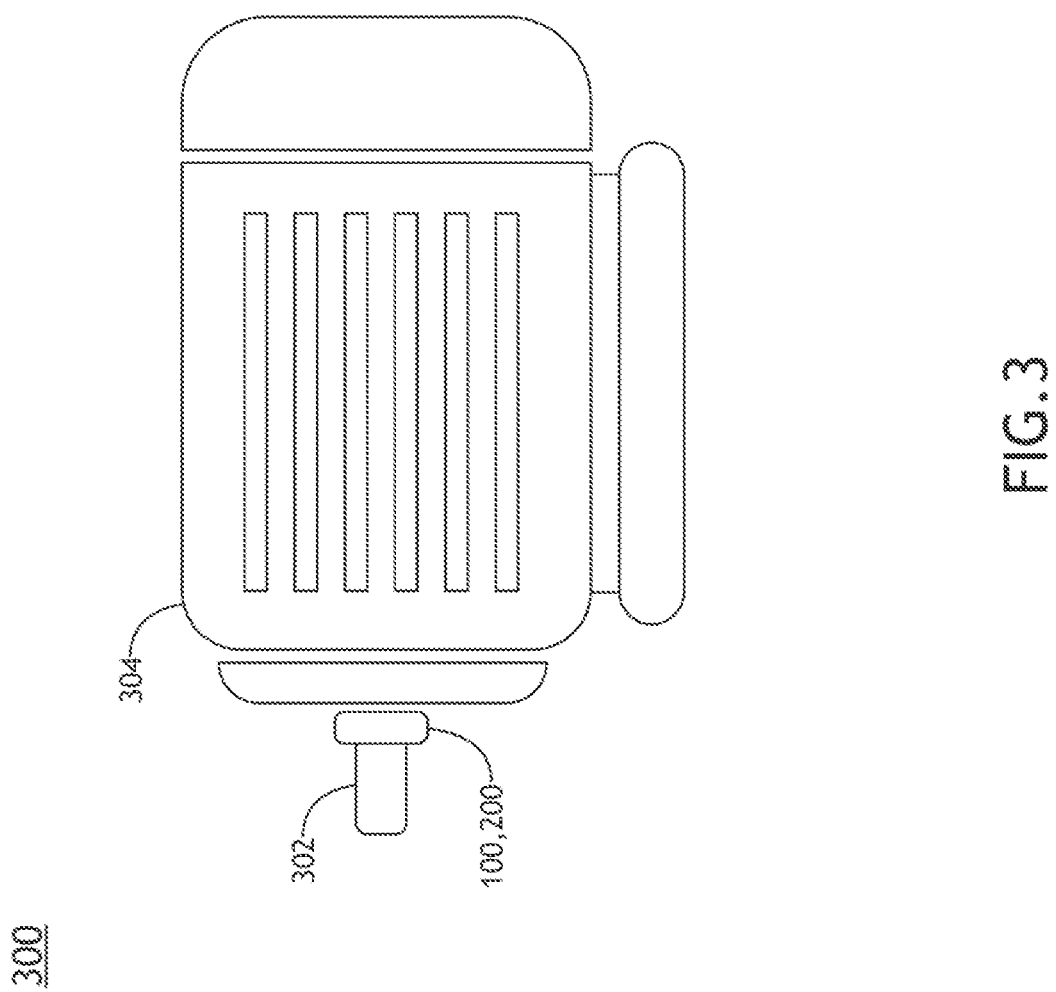

ROLLING BEARING WITH DISCHARGE ELEMENT

TECHNICAL FIELD

The present disclosure generally relates to bearings with rolling contact for rotary movement, and, more particularly, to bearings for reducing electrical discharge machining.

BACKGROUND

Bearings are commonly used to reduce parasitic drag between components that are intended to have relative rotation. Bearings commonly utilize rollers such as balls which maintain predominantly rolling contact, as opposed to sliding contact, with the two components.

Rolling bearings are widely used in various electric motors applications, including automotive and industrial applications. Electric motors with Pulse Width Modulation (PWM) in variable frequency drives (VFD) are used to provide an efficient way to vary the speed and torque of the connected motor. A high switching rate frequency results in reduced bearing life and increased rate of bearing failures. The reduced bearing life and increased rate of bearing failures is due to currents flowing from the rotating shaft to the machine frame through the bearings. Such currents flowing through the bearings manifest as damage due to Electrical Discharge Machining (EDM). Electrical Discharge Machining may cause pitting, fluting, and fusion craters within the rolling bearing resulting in the reduced bearing life and increased rate of bearing failures. Therefore, it would be advantageous to provide a device, system, and method that cures the shortcomings described above.

SUMMARY

A rolling bearing is described, in accordance with one or more embodiments of the present disclosure. The rolling bearing may include: an outer ring defining an outer ring race; an inner ring defining an inner ring race, wherein the inner ring is configured to rotate relative to the outer ring; a plurality of rolling elements, wherein the plurality of rolling elements maintain rolling contact between the outer ring race and the inner ring race; a cage including a first cage-half and a second cage-half which are joined together, wherein the first cage-half and the second cage-half define a plurality of semi-circle portions and a plurality of rib portions, wherein the plurality of rib portions join adjacent of the plurality of semi-circle portions, wherein the plurality of semi-circle portions hold the plurality of rolling elements; and a plurality of discharge elements, wherein the plurality of discharge elements include a plurality of tubes and a plurality of filaments, wherein the plurality of tubes are fixed to the plurality of semi-circle portions, wherein the plurality of tubes are hollow along an entire length, wherein the plurality of tubes bundle the plurality of filaments within the plurality of tubes along the entire length, wherein the plurality of filaments extend radially outward and radially inward from the cage, wherein the plurality of filaments contact the outer ring and the inner ring.

In some aspects, the plurality of rolling elements include spherical rolling elements.

In some aspects, the plurality of filaments include carbon fiber filaments.

In some aspects, the cage is a steel cage, wherein the plurality of tubes are fixed to the cage by a weld.

In some aspects, the plurality of tubes are fixed to a mid-point of the plurality of semi-circle portions between adjacent of the plurality of rib portions.

In some aspects, the plurality of filaments include a continuous length between the outer ring and the inner ring.

In some aspects, the plurality of rib portions of the first cage-half are coupled to the plurality of rib portions of the second cage-half.

In some aspects, the plurality of rib portions are coupled by a plurality of rivets.

In some aspects, the plurality of semi-circle portions of the first cage-half are aligned with the plurality of semi-circle portions of the second cage-half, wherein the plurality of rolling elements are held between the plurality of semi-circle portions of the first cage-half and the plurality of semi-circle portions of the second cage-half.

In some aspects, the outer ring defines a first outer ring ledge and a second outer ring ledge, wherein the outer ring race is disposed between the first outer ring ledge and the second outer ring ledge; wherein the inner ring defines a first inner ring ledge and a second inner ring ledge, wherein the outer ring race is disposed between the first inner ring ledge and the second inner ring ledge; wherein the first outer ring ledge is aligned with the first inner ring ledge, wherein the second outer ring ledge is aligned with the second inner ring ledge; wherein the plurality of filaments extend between and contact the first outer ring ledge and the first inner ring ledge and extend between and contact the second outer ring ledge and the second inner ring ledge.

A rolling bearing is described, in accordance with one or more embodiments of the present disclosure. The rolling bearing may include: an outer ring defining an outer ring race; an inner ring defining an inner ring race, wherein the inner ring is configured to rotate relative to the outer ring; a plurality of rolling elements, wherein the plurality of rolling elements maintain rolling contact between the outer ring race and the inner ring race; a cage, wherein the cage is monolithic, wherein the cage defines a plurality of rib portions and a plurality of major-arc portions, wherein the plurality of rib portions join adjacent of the plurality of major-arc portions, wherein the plurality of major-arc portions hold the plurality of rolling elements; and a plurality of discharge elements, wherein the plurality of discharge elements include a plurality of tubes and a plurality of filaments, wherein the plurality of tubes are fixed to the plurality of rib portions, wherein the plurality of tubes are hollow along an entire length, wherein the plurality of tubes bundle the plurality of filaments within the plurality of tubes along the entire length, wherein the plurality of filaments extend radially outward and radially inward from the cage, wherein the plurality of filaments contact the outer ring and the inner ring.

In some aspects, the plurality of rolling elements include spherical rolling elements.

In some aspects, the plurality of filaments include carbon fiber filaments.

In some aspects, the cage is a plastic cage, wherein the plurality of tubes are fixed within the plurality of rib portions by over-molding the plurality of tubes within the plurality of rib portions.

In some aspects, the plurality of tubes are fixed to the plurality of rib portions at a mid-point of the plurality of rib portions between adjacent of the plurality of major-arc portions.

In some aspects, the plurality of filaments include a continuous length between the outer ring and the inner ring.

In some aspects, the plurality of rolling elements are press-fit into the plurality of major-arc portions.

In some aspects, the outer ring defines a first outer ring ledge and a second outer ring ledge, wherein the outer ring race is disposed between the first outer ring ledge and the second outer ring ledge; wherein the inner ring defines a first inner ring ledge and a second inner ring ledge, wherein the outer ring race is disposed between the first inner ring ledge and the second inner ring ledge; wherein the first outer ring ledge is aligned with the first inner ring ledge, wherein the second outer ring ledge is aligned with the second inner ring ledge; wherein the plurality of filaments extend between and contact the first outer ring ledge and the first inner ring ledge.

In some aspects, the plurality of filaments do not contact the second outer ring ledge and the second inner ring ledge.

An electric motor is described, in accordance with one or more embodiments of the present disclosure. The electric motor may include: a rolling bearing including: an outer ring defining an outer ring race; an inner ring defining an inner ring race, wherein the inner ring is configured to rotate relative to the outer ring; a plurality of rolling elements, wherein the plurality of rolling elements maintain rolling contact between the outer ring race and the inner ring race; a cage including a first cage-half and a second cage-half which are joined together, wherein the first cage-half and the second cage-half define a plurality of semi-circle portions and a plurality of rib portions, wherein the plurality of rib portions join adjacent of the plurality of semi-circle portions, wherein the plurality of semi-circle portions hold the plurality of rolling elements; and a plurality of discharge elements, wherein the plurality of discharge elements include a plurality of tubes and a plurality of filaments, wherein the plurality of tubes are fixed to the plurality of semi-circle portions, wherein the plurality of tubes are hollow along an entire length, wherein the plurality of tubes bundle the plurality of filaments within the plurality of tubes along the entire length, wherein the plurality of filaments extend radially outward and radially inward from the cage, wherein the plurality of filaments contact the outer ring and the inner ring; a rotor, wherein the inner ring is coupled to the rotor; and a stator, wherein the outer ring is coupled to the stator, wherein the rotor is configured to rotate relative to the stator via the rolling bearing.

BRIEF DESCRIPTION OF THE DRAWINGS

The numerous advantages of the disclosure may be better understood by those skilled in the art by reference to the accompanying figures in which:

FIG. 1C illustrates a section view of the rolling bearing, in accordance with one or more embodiments of the present disclosure.

FIG. 2C illustrates a section view of the rolling bearing, in accordance with one or more embodiments of the present disclosure.

FIG. 2D illustrates a partial view of the section view of FIG. 20, in accordance with one or more embodiments of the present disclosure.

FIG. 2E illustrates an exploded view of the rolling bearing, in accordance with one or more embodiments of the present disclosure.

FIG. 3 illustrates an electric motor with a rolling bearing, in accordance with one or more embodiments of the present disclosure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for applications or implementations.

Embodiments of the present disclosure are directed to rolling bearings. The rolling bearings may include outer and inner rings defining races, rolling elements which maintain rolling contact between the races, a cage holding the rolling elements, and discharge elements. The cage may include cage-halves which are joined together. The cage-halves may define semi-circle portions which hold the rolling elements and to which the discharge elements are fixed and may also define rib portions. The cage may also be monolithic and define rib portions to which the discharge elements are fixed and major-arc portions which may hold the rolling elements by a press-fit. The discharge elements may include tubes which are fixed to the semi-circle portions and/or the rib portions. The discharge elements may also include filaments which may extend from the cage and contact the outer and inner rings. The rolling bearings may join a stator and rotor of an electric motor.

Figure 1A:
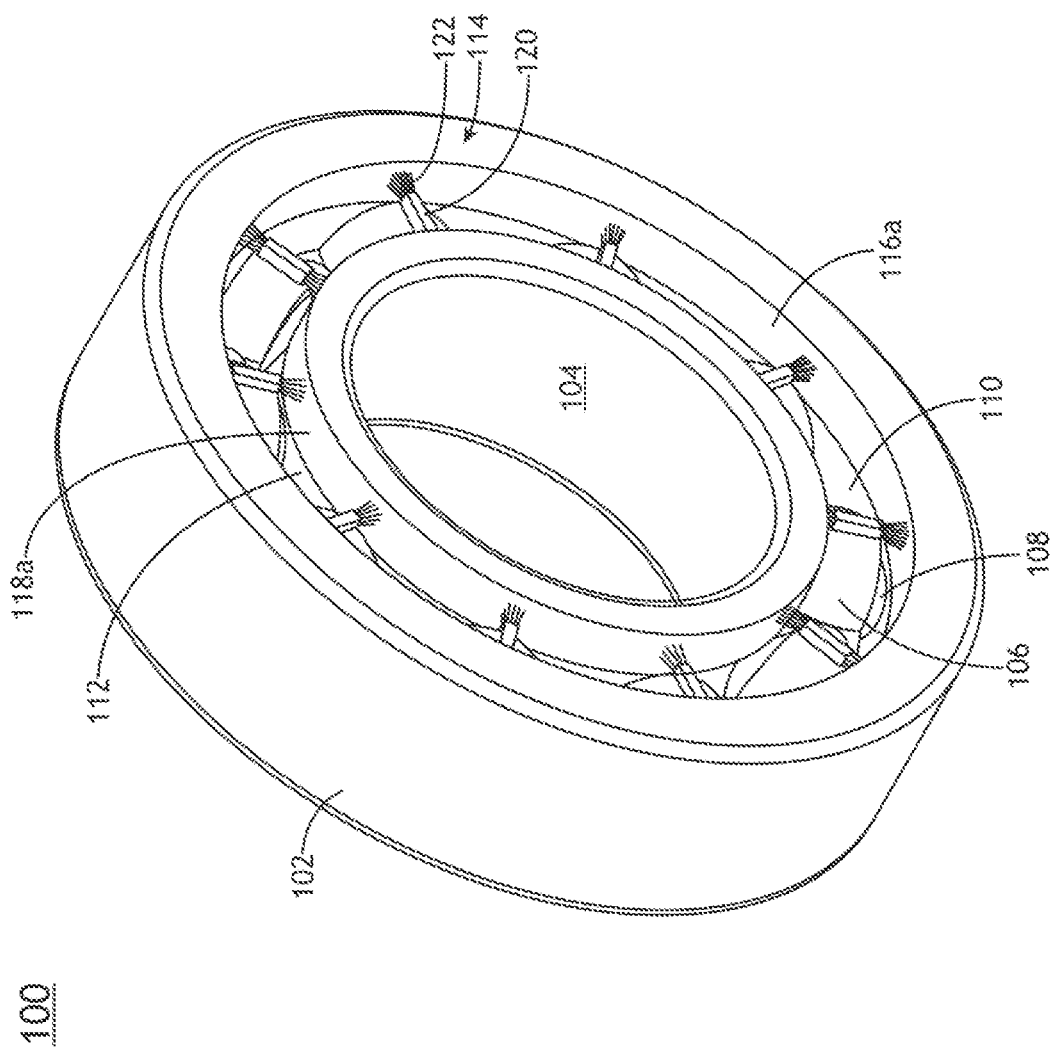
FIG. 1A illustrates a perspective view of a rolling bearing, in accordance with one or more embodiments of the present disclosure.
Figure 1B:
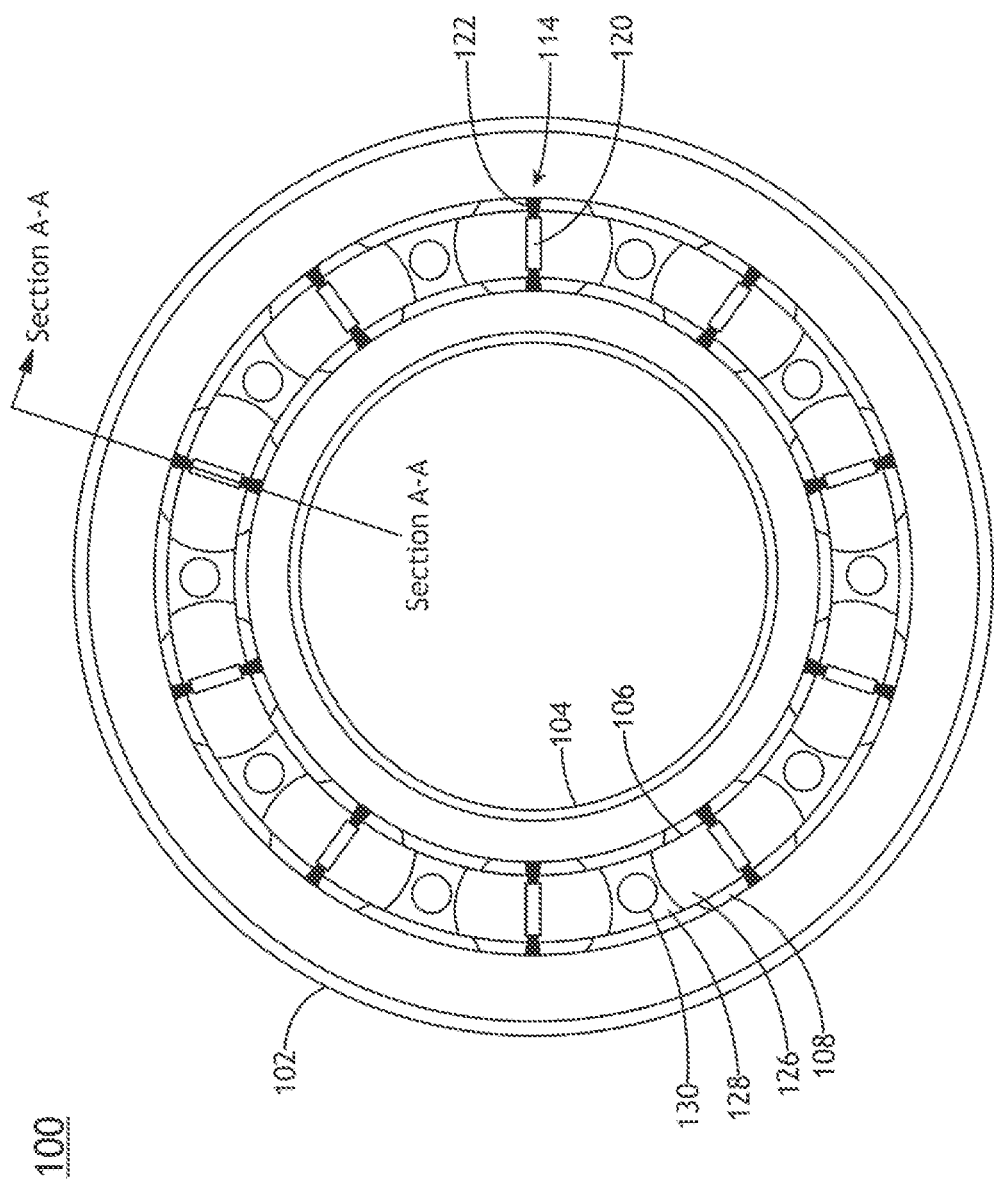
FIG. 1B illustrates a side view of the rolling bearing, in accordance with one or more embodiments of the present disclosure.
Figure 1D:
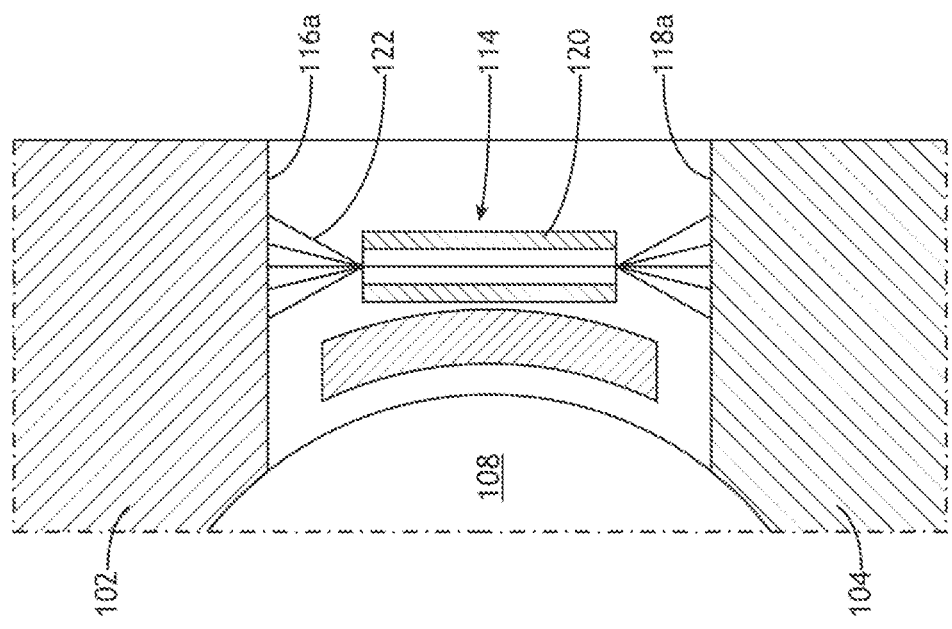
FIG. 1D illustrates a partial view of the section view of FIG. 1C, in accordance with one or more embodiments of the present disclosure.
Figure 1E:
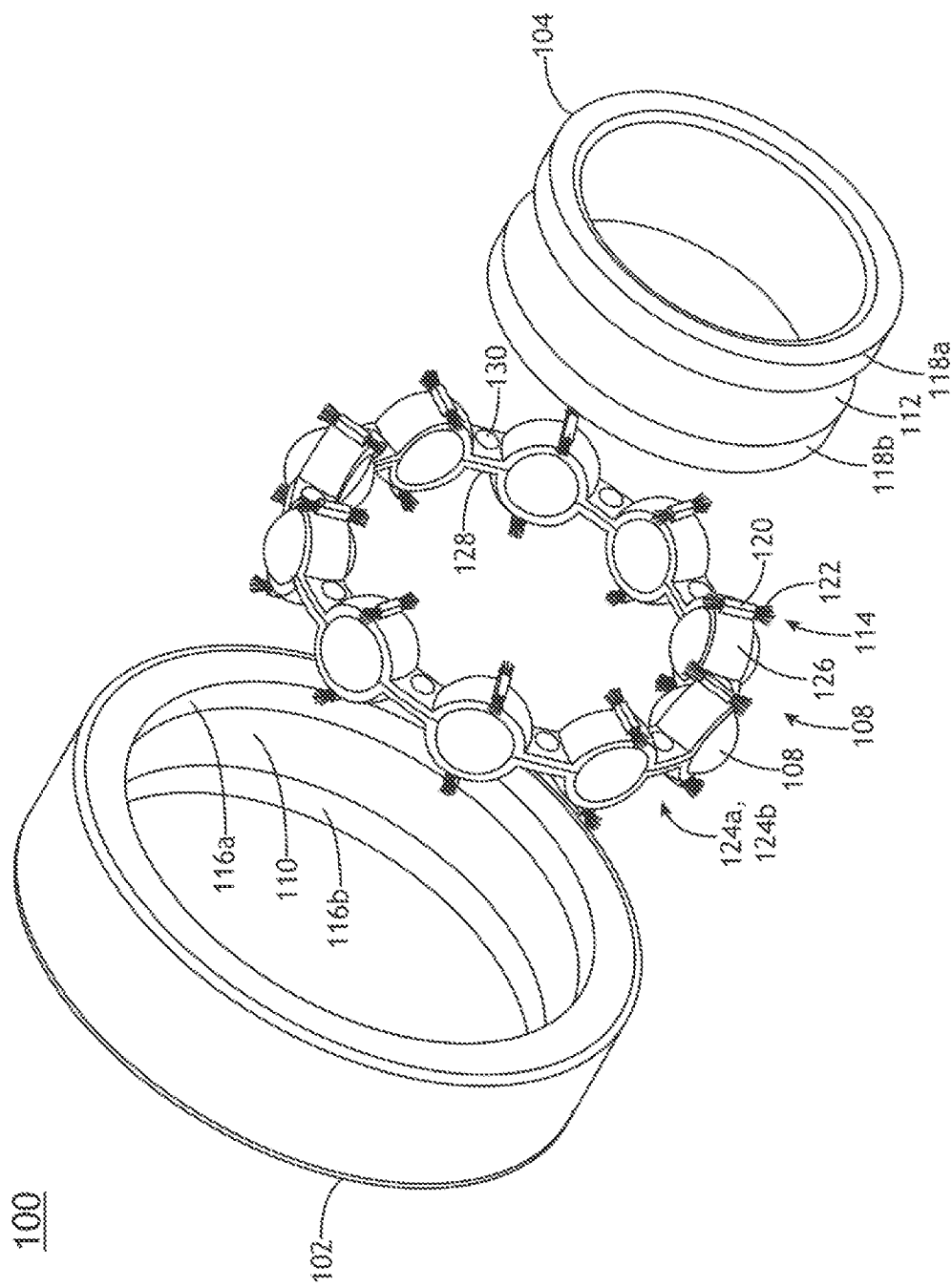
FIG. 1E illustrates an exploded view of the rolling bearing, in accordance with one or more embodiments of the present disclosure.
Figure 1F:
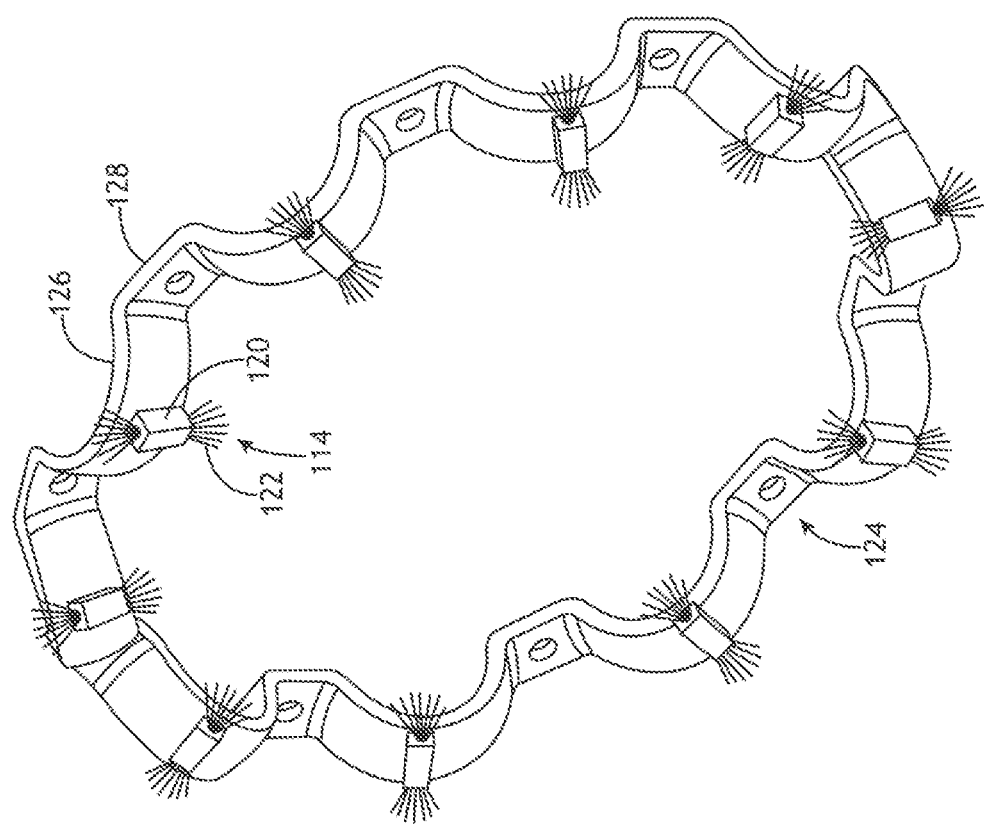
FIG. 1F illustrates a perspective view of a cage-half of the cage of the rolling bearing, in accordance with one or more embodiments of the present disclosure.

FIGS. 1A-1F illustrate a rolling bearing 100, in accordance with one or more embodiments of the present disclosure. The rolling bearing 100 may be a roller bearing, a rolling contact bearing, a ball bearing, a rolling element bearing, a radial bearing, a radial ball bearing, or the like. The rolling bearing 100 may be a ball bearing assembly with electrical discharge damage protection. The rolling bearing 100 may include an outer ring 102, an inner ring 104, a cage 106, rolling elements 108, and discharge elements 114.

The outer ring 102, the inner ring 104, and the cage 106 may be disposed around a central axis of the rolling bearing 100. The outer ring 102 and the inner ring 104 may be a radially outer ring and a radially inner ring, respectively. The inner ring 104 may be configured to rotate relative to the outer ring 102. The rolling bearing 100 may permit the relative rotation between the outer ring 102 and the inner ring 104. The relative rotation between the outer ring 102 and the inner ring 104 may occur about the central axis of the rolling bearing 100.

The outer ring 102 and inner ring 104 may define an outer ring race 110 and inner ring race 112, respectively. The term race may also be referred to as a raceway. The outer ring race 110 and/or the inner ring race 112 may be annular. The outer ring race 110 and/or the inner ring race 112 may include a cross-section with a selected shape, such as, but not limited to, a minor-arc shape (e.g., an arc that is less than a semi-circle). The outer ring race 110 and the inner ring race 112 may face towards and away from, respectively, the central axis of the rolling bearing 100.

The outer ring 102 and inner ring 104 may define outer ring ledges 116 and inner ring ledges 118, respectively. The outer ring race 110 and the inner ring race 112 may be disposed between the outer ring ledges 116 and inner ring ledges 118, respectively. The outer ring ledges 116 may include a first outer ring ledge 116a and a second outer ring ledge 116b. The outer ring race 110 may be disposed between the first outer ring ledge 116a and the second outer ring ledge 116b. Similarly, the inner ring ledges 118 may include a first inner ring ledge 118a and a second inner ring ledge 118b. The inner ring race 112 may be disposed between the first inner ring ledge 118a and the second inner ring ledge 118b. The first outer ring ledge 116a and the second outer ring ledge 116b may be aligned with the first inner ring ledge 118a and the second inner ring ledge 118b, respectively.

The rolling elements 108 may maintain rolling contact between the outer ring race 110 and the inner ring race 112. The rolling elements 108 may be configured to roll on the outer ring race 110 and the inner ring race 112 by maintaining the rolling contact. The rolling elements 108 may be supported to roll on both the outer ring race 110 and the inner ring race 112. The rolling elements 108 may be spherical rolling elements, such as ball bearings. The rolling elements 108 may be the only load support rolling elements of the rolling bearing 100. The rolling elements 108 may be essentially the same size.

The cage 106 may be disposed between the outer ring 102 and the inner ring 104. For example, the cage 106 may be disposed between the outer ring race 110 and the inner ring race 112.

The rolling elements 108 may be held in the cage 106. In this regard, the cage 106 may be a ball cage. The cage 106 may hold the rolling elements 108 in a circular row. In this regard, the rolling elements 108 may move along a full circle. The cage 106 may prevent the rolling elements 108 from rubbing against adjacent of the rolling elements 108, thereby reducing friction, wear, and binding of the rolling elements 108. In this regard, the rolling elements 108 may be separated from adjacent of the rolling elements 108 around the circumference of the outer ring race 110 and the inner ring race 112 by the cage 106.

The cage 106 may be formed from a selected material. The selected material may include but is not limited to steel, plastic, or the like. In embodiments, the cage 106 may be a steel cage or a plastic cage. The steel cage may permit relative rotations between the outer ring 102 and the inner ring 104 at higher revolutions per minute (RPMs) than the plastic cage. For example, the plastic cage may melt at when at the higher RPMs. The steel cage may be a high-speed ball cage. Similarly, the rolling bearing 100 may be a high-speed rolling bearing. The high-speed rolling bearing may include the steel cage with an integrated electrical discharge element.

The cage 106 may include a pair of cage-halves 124. The pair of cage-halves 124 may be coupled together to form the cage 106. For example, the cage-halves 124 may include a first cage-half 124a and a second cage-half 124b. The first cage-half 124a may be aligned with the first outer ring ledge 116a and the first inner ring ledge 118a. The second cage-half 124b may be aligned with the second outer ring ledge 116b and the second inner ring ledge 118b.

The first cage-half 124a and the second cage-half 124b may be joined together to form the cage 106. The cage 106 may include one or more types, such as, but not limited to, a J-type cage, an RJ-type cage, or the like.

The cage-halves 124 (e.g., the first cage-half 124a, the second cage-half 124b) may define semi-circle portions 126 and rib portions 128. The rib portions 128 may join adjacent of the semi-circle portions 126. The semi-circle portions 126 and rib portions 128 may be arranged in a circular array. For example, the semi-circle portions 126 and rib portions 128 may be with the semi-circle portions 126 and rib portions 128 repeating in sequence. The spacing between the semi-circle portions 126 and rib portions 128 may be equidistant along the circular array.

The cage-halves 124 may be coupled together by coupling together the rib portions 128. The rib portions 128 of the first cage-half 124a may abut the rib portions 128 of the second cage-half 124b. The rib portions 128 of the first cage-half 124a may be coupled to the rib portions 128 of the second cage-half 124b. The rib portions 128 may be coupled together by one or more fasteners. For example, the rib portions may be coupled by rivets 130, or the like. The rib portions 128 may define one or more through holes through which the rivets 130 may be inserted.

The semi-circle portions 126 may hold the rolling elements 108. The semi-circle portions 126 of the first cage-half 124a may be aligned with the semi-circle portions 126 of the second cage-half 124b. The rolling elements 108 may be held between the semi-circle portions 126 of the first cage-half 124a and the semi-circle portions 126 of the second cage-half 124b. The cage-halves 124 may define one of the semi-circle portions 126 for each of the rolling elements 108. Similarly, the cage 106 may include a joined pair of the semi-circle portions 126 for each of the rolling elements 108.

The discharge elements 114 may be electrical discharge elements. The discharge elements 114 may also be referred to as brushes, grounding brushes, or the like. The discharge elements 114 may include tubes 120 and filaments 122.

The discharge elements 114 may be coupled to the cage 106. The discharge elements 114 may be integrated with the cage 106 for high-speed ball bearing damage protection. In this regard, the cage 106 may be a steel cage with integrated electrical discharge elements.

The tubes 120 may be hollow along the entire length (e.g., the entire length of the tubes 120). The tubes 120 may include any suitable cross-section, such as, but not limited to, rectangular, circular, or the like. The dimensions of the cross-section may or may not be uniform along the entire length of the tubes 120. For example, the tubes 120 may include a uniform cross-section along the entire length of the tubes 120. This example may be an uncrimped tube. By way of another example, the tubes 120 may include wider cross-section at the ends of the tubes 120 and a narrower cross-section along the middle of the tubes 120. This example may be a crimped tube, where the crimp is along the middle of the tubes 120. It is contemplated that crimping the tubes 120 may be beneficial to maintain the filaments 122 within the tubes 120. Care may be taken when crimping the tubes 120 to prevent breaking the filaments 122.

The tubes 120 may be electrically conductive or non-conductive. The tubes 120 may be made of a select material, such as, but not limited to a metal (steel), a plastic, or the like. For example, the tubes 120 may be steel tubes or plastic tubes.

The tubes 120 may be fixed to the cage 106. The tubes 120 may be fixed to the cage 106 by a weld, a mechanical fastener, a chemically bond, or the like. Where the cage 106 is a steel cage and the tubes 120 are steel tubes, the steel tubes may be fixed to the steel cage by the weld. Similarly, where the cage 106 is a plastic cage and the tubes 120 are plastic tubes, the plastic tubes may be fixed to the plastic cage by the weld (e.g., a plastic weld).

The tubes 120 may be fixed to the cage-halves 124. For example, the tubes 120 may be fixed to the first cage-half 124a and/or the second cage-half 124b.

The tubes 120 may be arranged circumferentially spaced apart around the cage 106. The tubes 120 may be fixed to the semi-circle portions 126 of the cage-halves 124. For example, the tubes 120 may be fixed to the semi-circle portions 126 of the cage-halves 124 at a mid-point of the semi-circle portions 126. The mid-point may be the mid-point of the semi-circle portions 126 between adjacent of the rib portions 128. The tubes 120 may be arranged circumferentially spaced apart around the cage 106 by fixing at the mid-point of the semi-circle portions 126.

The tubes 120 may each bundle a plurality of the filaments 122. Thus, each of the discharge elements 114 may include a bundle of the filaments 122. The tubes 120 may bundle the filaments 122 within the tubes 120 along the entire length of the tubes 120. The number of the filaments 122 per tube may be based on a size of the cross-section of the filaments and a size of the cross-section of the tubes 120.

The filaments 122 may contact the outer ring 102 and the inner ring 104. In this regard, the filaments 122 may span between the outer ring 102 and the inner ring 104.

The filaments 122 may extend radially inwards and radially outwards from the cage 106. The filaments 122 may include a continuous length between the outer ring 102 and the inner ring 104 which is not separated by the cage 106 and/or the tubes 120.

The filaments 122 may extend between and contact the outer ring ledges 116 of the outer ring 102 and/or the inner ring ledges 118 of the inner ring 104. For example, the filaments 122 may extend between and contact the first outer ring ledge 116a and the first inner ring ledge 118a. For instance, the filaments 122 of the discharge elements 114 which are coupled to the first cage-half 124a may extend between and contact the first outer ring ledge 116a and the first inner ring ledge 118a. By way of another example, the filaments 122 may extend between and contact the second outer ring ledge 116b and the second inner ring ledge 118b. For instance, the filaments 122 of the discharge elements 114 which are coupled to the second cage-half 124b may extend between and contact the second outer ring ledge 116b and the second inner ring ledge 118b. By way of another example, the filaments 122 may extend between and contact the first outer ring ledge 116a and the first inner ring ledge 118a and extend between and contact the second outer ring ledge 116b and the second inner ring ledge 118b. For instance, the filaments 122 of the discharge elements 114 which are coupled to the first cage-half 124a may extend between and contact the first outer ring ledge 116a and the first inner ring ledge 118a and the filaments 122 of the discharge elements 114 which are coupled to the second cage-half 124b may extend between and contact the second outer ring ledge 116b and the second inner ring ledge 118b. The filaments 122 may be considered long fibers by including a continuous length extending between and contacting the outer ring ledges 116 and the inner ring ledges 118.

The filaments 122 may be flexible. The filaments 122 may flex to allow relative rotation between the outer ring 102 and the inner ring 104 while the filaments 122 contacts the outer ring 102 and the inner ring 104.

The filaments 122 may be electrically conductive. The filaments 122 may be electrically conductive by having a low electrical resistance. The filaments 122 may be made of a select material which is electrically conductive. For example, the filaments 122 may be carbon fiber filaments.

The filaments 122 may form a conductive path between the outer ring 102 and the inner ring 104 by contacting the outer ring 102 and the inner ring 104. The conductive path may be along the entire length of the filaments 122. The conductive path may between the outer ring ledges 116 and the inner ring ledges 118. For example, the conductive path may be between the first outer ring ledge 116a and the first inner ring ledge 118a and/or between the second outer ring ledge 116b and the second inner ring ledge 118b. The conductive path between the outer ring ledges 116 and the inner ring ledges 118 may be through the filaments 122 without passing through the cage 106 and/or tubes 120 by the filaments 122 spanning between the outer ring ledges 116 and the inner ring ledges 118.

The filaments 122 may maintain the conductive path between the outer ring 102 and the inner ring 104 (e.g., outer ring ledges 116 and the inner ring ledges 118) with relative rotation between the outer ring 102 and the inner ring 104. Similarly, the filaments 122 may maintain the conductive path between the outer ring 102 and the inner ring 104 (e.g., outer ring ledges 116 and the inner ring ledges 118) as the cage 106 and rolling elements 108 rotates relative to the outer ring 102 and/or the inner ring 104.

The filaments 122 may carry an electrical current, also referred to as a shunt current, between the outer ring 102 and the inner ring 104. The filaments 122 may allow a continuous flow of the electrical current between the outer ring 102 and the inner ring 104, thereby maintaining the outer ring 102 and the inner ring 104 at a same electric potential. The discharge elements 114 may provide an electrical shunt with a controlled and near constant low impedance path between the outer ring 102 and the inner ring 104. The electrical current may be shunted between the outer ring ledges 116 and the inner ring ledges 118. For example, the electrical current may be shunted between the first outer ring ledge 116a and the first inner ring ledge 118a and/or shunted between the second outer ring ledge 116b and/or the second inner ring ledge 118b.

The electrical current may flow through the filaments 122 as a path of least resistance for grounding the outer ring 102 to the inner ring 104. The filaments 122 may include a lower electrical resistance than the tubes 120, the cage 106, and/or the rolling elements 108. Including the lower electrical resistance than the tubes 120, the cage 106, and/or the rolling elements 108 may cause the electrical current to primarily travel between the outer ring 102 and the inner ring 104 through the filaments 122 rather than through the cage 106 and/or the rolling elements 108. A conductive path between the outer ring 102 and the inner ring 104 through the rolling elements 108 is thereby reduced by the filaments 122.

Current flow between the outer ring 102 and the inner ring 104 through the rolling elements 108 may cause Electrical Discharge Machining of the outer ring 102 and/or the inner ring 104. For example, the Electrical Discharge Machining may be on the outer ring race 110 and/or the inner ring race 112. The Electrical Discharge Machining may cause pitting, fluting, and fusion craters on the outer ring 102 and/or the inner ring 104. The current flow through the filaments 122 may reduce the Electrical Discharge Machining between the rolling elements 108 and the outer ring 102 and/or the inner ring 104. Reducing the Electrical Discharge Machining may be beneficial to prevent premature failure of the rolling bearing 100.

The filaments 122 may introduce drag between the outer ring 102 and the inner ring 104 when contacting the outer ring 102 and the inner ring 104. It is contemplated that the loss in efficiency of the rolling bearing 100 due to the drag may be less than a loss in efficiency due to pitting caused by Electrical Discharge Machining between the outer ring race 110, the inner ring race 112, and/or the rolling elements 108.

Figure 2A:
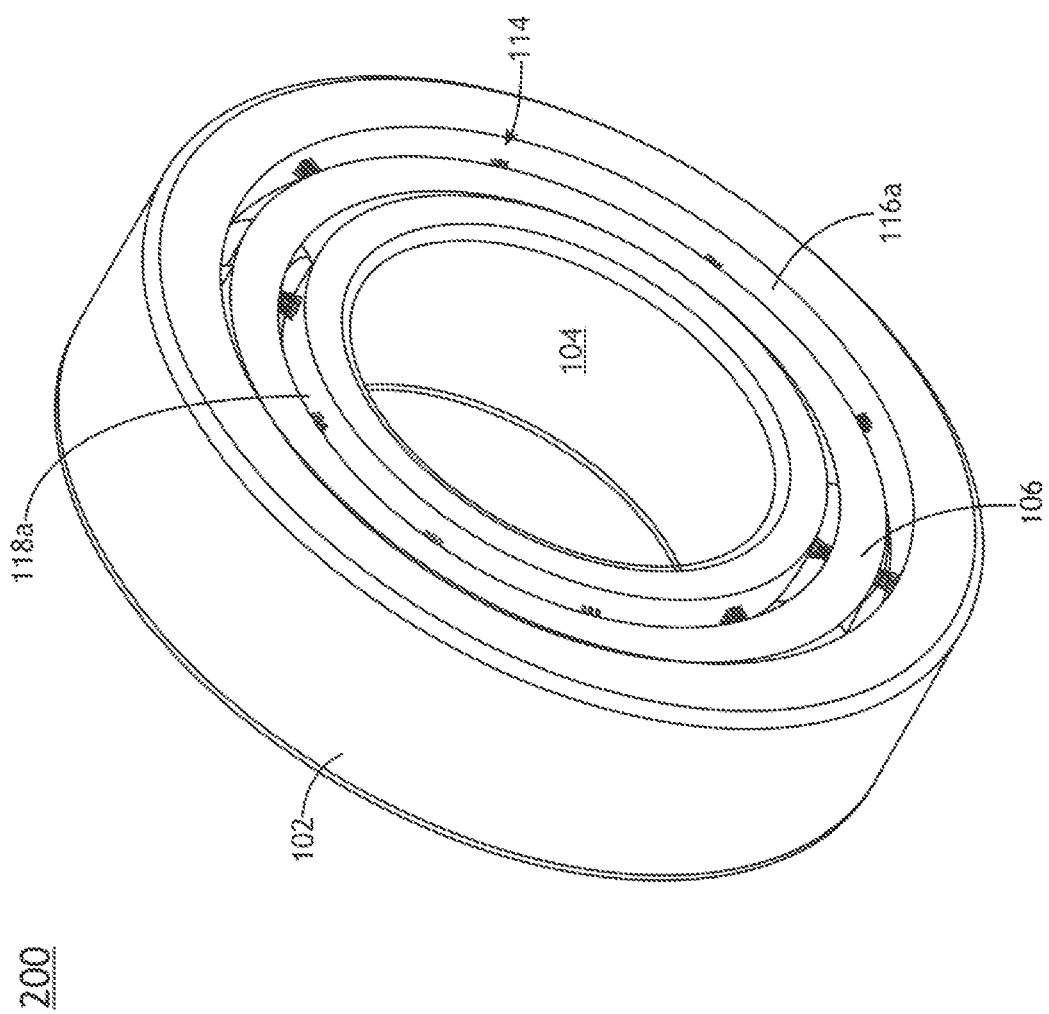
FIG. 2A illustrates a perspective view of a rolling bearing, in accordance with one or more embodiments of the present disclosure.
Figure 2B:
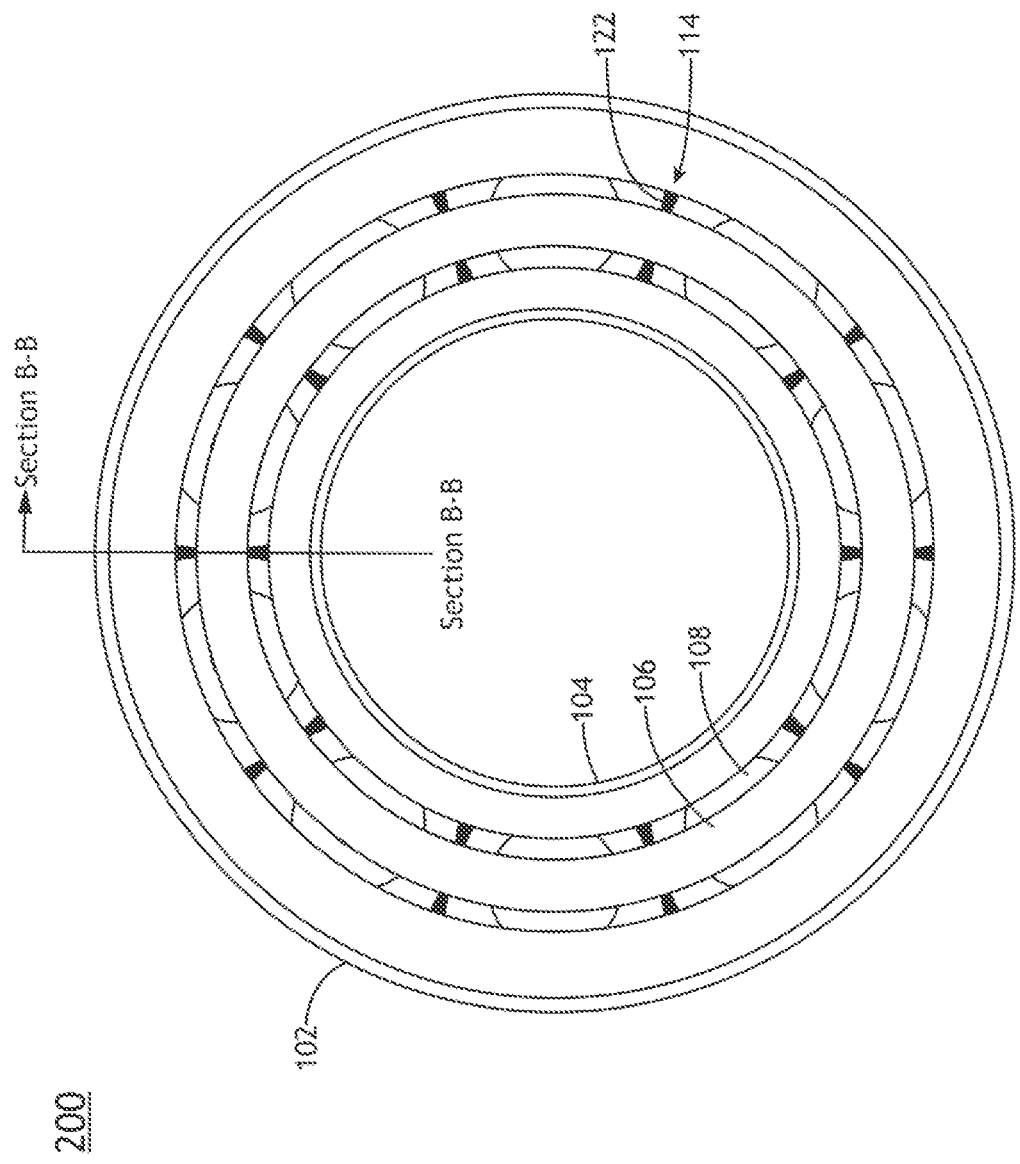
FIG. 2B illustrates a side view of the rolling bearing, in accordance with one or more embodiments of the present disclosure.
Figure 2F:
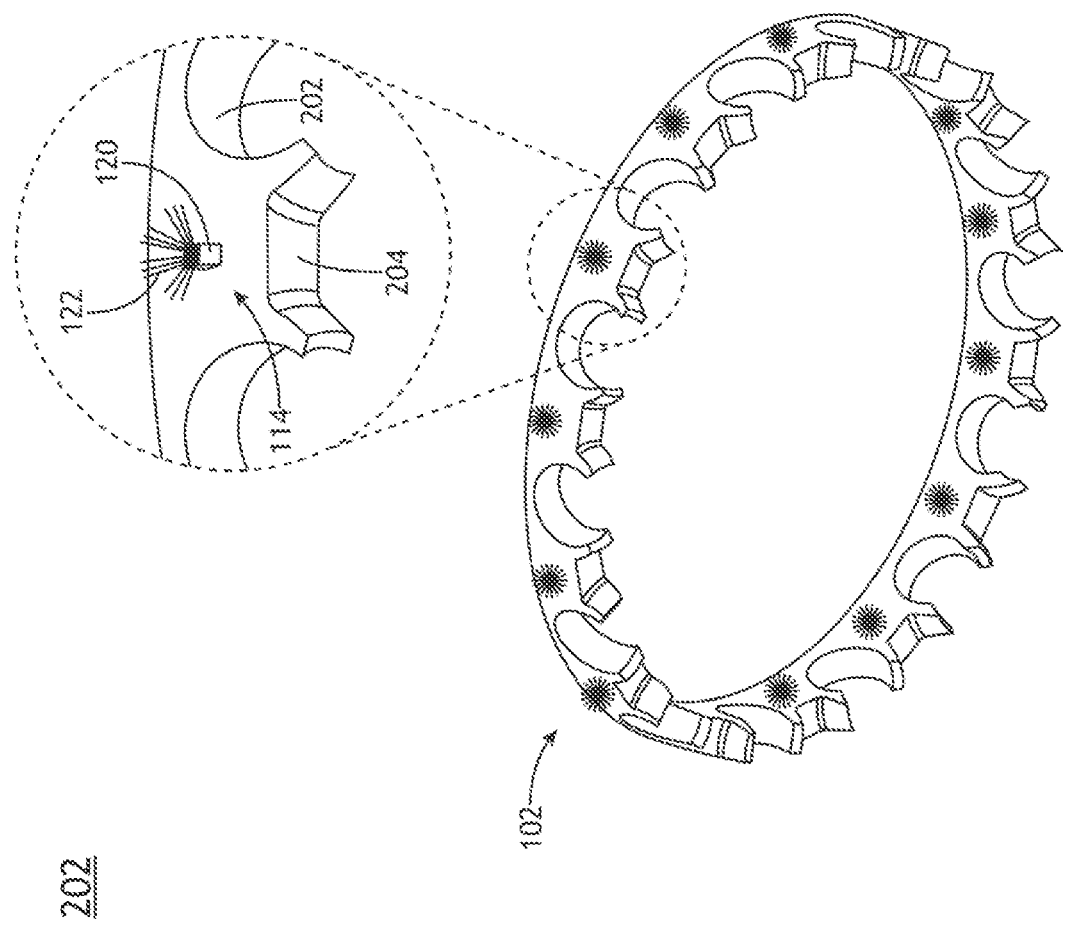
FIG. 2F illustrates a perspective view of a cage of the rolling bearing, in accordance with one or more embodiments of the present disclosure.

FIGS. 2A-2F illustrate a rolling bearing 200, in accordance with one or more embodiments of the present disclosure. The discussion of the rolling bearing 100 is incorporated herein by reference as to the rolling bearing 200. The rolling bearing 200 may include the outer ring 102, the inner ring 104, a cage 202, and the rolling elements 108. The discussion of the cage 106 is incorporated herein by reference as to the cage 202.

The cage 202 may be disposed between the outer ring 102 and the inner ring 104. The cage 202 may be disposed between the outer ring race 110 and the inner ring race 112.

The rolling elements 108 may be held in the cage 202. In this regard, the cage 202 may be a ball cage. The cage 202 may hold the rolling elements 108 in a circular row. In this regard, the rolling elements 108 may move along a full circle. The cage 202 may prevent the rolling elements 108 from rubbing against adjacent of the rolling elements 108, thereby reducing friction, wear, and binding of the rolling elements 108. In this regard, the rolling elements 108 may be separated from adjacent of the rolling elements 108 around the circumference of the outer ring race 110 and the inner ring race 112 by the cage 202. The rolling elements 108 may be press-fit into the cage 202. The cage 202 may be a press-fit ball cage.

The cage 202 may be formed from a selected material. The selected material may include but is not limited to plastic (e.g., nylon). In embodiments, the cage 202 may be a plastic cage. The plastic cage may permit relative rotations between the outer ring 102 and the inner ring 104 at lower revolutions per minute (RPMs) than a steel cage. For example, the plastic cage may melt at when at the higher RPMs. The cage 202 may be a plastic cage with an integrated electrical discharge element.

The cage 202 may be monolithic. In this regard, the cage 202 may be a single piece which is not formed of halves or other constituent pieces. The cage 202 may include one or more types, such as, but not limited to, a "TW" type.

The cage 202 may define rib portions 204 and major-arc portions 206. The rib portions 204 may join adjacent of the major-arc portions 206. The rib portions 204 and major-arc portions 206 may be arranged in a circular array. For example, the rib portions 204 and major-arc portions 206 may be arranged with the rib portions 204 and major-arc portions 206 repeating in sequence. The spacing between the rib portions 204 and major-arc portions 206 may be equidistant along the circular array.

The rib portions 204 may be disposed between the first outer ring ledge 116a and the first inner ring ledge 118a. The rib portions 204 may not be disposed between the second outer ring ledge 116b and the second inner ring ledge 118b.

The major-arc portions 206 may include a major arc between a circle and a semi-circle. The major-arc portions 206 may hold the rolling elements 108. The rolling elements 108 may be held within the major-arc portions 206 of the major-arc portions 206. For example, rolling elements 108 may be press-fit into the major-arc portions 206 to hold the rolling elements 108. The cage 202 may include one of the major-arc portions 206 for each of the rolling elements 108.

The discharge elements 114 may be coupled to the cage 202. The discharge elements 114 may be integrated with the cage 202 for ball bearing damage protection. In this regard, the cage 202 may be a plastic cage with integrated electrical discharge elements.

The tubes 120 may be fixed to the cage 202. The tubes 120 may be fixed to the cage 202 by a weld, a mechanical fastener, a chemical bond, or the like. Where the cage 202 is a plastic cage, the plastic tubes may be fixed to the plastic cage by the plastic weld.

The tubes 120 may be fixed to the rib portions 204. The tubes 120 may be fixed within the rib portions 204 by an assembly process and/or by over-molding the tubes 120 within the rib portions 204 during injection molding. The tubes 120 may be disposed within and extend through the rib portions 204. The filaments 122 may extend continuously through the cage 202 (e.g., the rib portions 204) and the tubes 120.

The tubes 120 may be arranged circumferentially spaced apart around the cage 202. The tubes 120 may be fixed to the rib portions 204. For example, the tubes 120 may be fixed to the rib portions 204 at a mid-point of the rib portions 204. The mid-point may be the mid-point of the rib portions 204 between adjacent of the major-arc portions 206. The tubes 120 may be arranged circumferentially spaced apart around the cage 202 by fixing at the mid-point of the rib portions 204.

The filaments 122 may extend radially inwards and radially outwards from the cage 202. The filaments 122 may include a continuous length between the outer ring 102 and the inner ring 104 which is not separated by the cage 202 and/or the tubes 120.

The filaments 122 may extend between and contact the first outer ring ledge 116a and the first inner ring ledge 118a. The filaments 122 may not contact the second outer ring ledge 116b and the second inner ring ledge 118b. For example, the configuration of the rib portions 204 may prevent including the filaments 122 which contact the contact the second outer ring ledge 116b and the second inner ring ledge 118b. The filaments 122 may be considered long fibers by spanning between the first outer ring ledge 116a and the first inner ring ledge 118a.

FIG. 3 illustrates an electric motor 300, in accordance with one or more embodiments of the present disclosure. The electric motor 300 may be an alternating current (AC) or direct current (DC) electrical motor, generator, or the like. The electric motor 300 may include a roller bearing (e.g., the rolling bearing 100, the rolling bearing 200), a rotor 302, a stator 304, and the like.

The outer ring 102 may be coupled to the stator 304. The inner ring 104 may be coupled to the rotor 302. The rotor 302 may be configured to rotate relative to the stator 304 via the rolling bearing (e.g., the rolling bearing 100, the rolling bearing 200).

The electric motor 300 may include a variable frequency drive (VFD). Fast switching variable frequency drives may cause stray currents that pass through the rolling bearing (e.g., the rolling bearing 100, the rolling bearing 200). The filaments 122 may prevent rotor 302 induced currents from Electrical Discharge Machining the rolling bearing due to electrical currents passing through the rolling bearing (e.g., the rolling bearing 100, the rolling bearing 200). The filaments 122 may thereby reduce the electric potential between the rotor 302 and the stator 304.

The rolling bearing (e.g., the rolling bearing 100, the rolling bearing 200) may be an open bearing. For example, the rolling bearing is depicted as an open bearing, although this is not intended to be limiting. The open bearing may or may not permit a fluid, such as automatic transmission fluid, to pass through the open bearing.

The rolling bearing (e.g., the rolling bearing 100, the rolling bearing 200) may be a sealed bearing. The sealed bearing may include one or more seals (not depicted) disposed between the outer ring 102 and the inner ring 104 to cover the cage (e.g., the cage 106, the cage 202) and the rolling elements 108. The seals may be axially offset from the cage and the rolling elements 108. The seals may be shields, covers, or the like. The rolling bearing may include a bearing grease. The bearing grease may be disposed between the outer ring race 110 and the inner ring race 112. The bearing grease may include a dielectric bearing grease or the like. The seals may seal the bearing grease between the outer ring race 110 and the inner ring race 112.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for applications.

LIST OF REFERENCE NUMBERS 100 rolling bearing
102 outer ring
104 inner ring
106 cage
108 rolling elements
110 outer ring race
112 inner ring race
114 discharge elements
116 outer ring ledges
116a first outer ring ledge
116b second outer ring ledge
118 inner ring ledges
118a first inner ring ledge
118b second inner ring ledge
120 tubes
122 filaments
124 cage-halves
124a first cage-half
124b second cage-half
126 semi-circle portions
128 rib portions
130 rivets
200 rolling bearing
202 cage
204 rib portions
206 major-arc portions
300 electric motor
302 rotor
304 stator

What is claimed:

1. A rolling bearing comprising:
an outer ring defining an outer ring race;
an inner ring defining an inner ring race, wherein the inner ring is configured to rotate relative to the outer ring;
a plurality of rolling elements, wherein the plurality of rolling elements maintain rolling contact between the outer ring race and the inner ring race;
a cage comprising a first cage-half and a second cage-half which are joined together, wherein the first cage-half and the second cage-half define a plurality of semi-circle portions and a plurality of rib portions, wherein the plurality of rib portions join adjacent of the plurality of semi-circle portions, wherein the plurality of semi-circle portions hold the plurality of rolling elements; and
a plurality of discharge elements, wherein the plurality of discharge elements comprise a plurality of tubes and a plurality of filaments, wherein the plurality of tubes are fixed to the plurality of semi-circle portions, wherein the plurality of tubes are hollow along an entire length, wherein the plurality of tubes bundle the plurality of filaments within the plurality of tubes along the entire length, wherein the plurality of filaments extend radially outward and radially inward from the cage, wherein the plurality of filaments contact the outer ring and the inner ring.

2. The rolling bearing of claim 1, wherein the plurality of rolling elements comprise spherical rolling elements.

3. The rolling bearing of claim 1, wherein the plurality of filaments comprise carbon fiber filaments.

4. The rolling bearing of claim 1, wherein the cage is a steel cage, wherein the plurality of tubes are fixed to the cage by a weld.

5. The rolling bearing of claim 1, wherein the plurality of tubes are fixed to a mid-point of the plurality of semi-circle portions between adjacent of the plurality of rib portions.

6. The rolling bearing of claim 1, wherein the plurality of filaments include a continuous length between the outer ring and the inner ring.

7. The rolling bearing of claim 1, wherein the plurality of rib portions of the first cage-half are coupled to the plurality of rib portions of the second cage-half.

8. The rolling bearing of claim 7, wherein the plurality of rib portions are coupled by a plurality of rivets.

9. The rolling bearing of claim 7, wherein the plurality of semi-circle portions of the first cage-half are aligned with the plurality of semi-circle portions of the second cage-half, wherein the plurality of rolling elements are held between the plurality of semi-circle portions of the first cage-half and the plurality of semi-circle portions of the second cage-half.

10. The rolling bearing of claim 1, wherein the outer ring defines a first outer ring ledge and a second outer ring ledge, wherein the outer ring race is disposed between the first outer ring ledge and the second outer ring ledge;
wherein the inner ring defines a first inner ring ledge and a second inner ring ledge, wherein the outer ring race is disposed between the first inner ring ledge and the second inner ring ledge;
wherein the first outer ring ledge is aligned with the first inner ring ledge, wherein the second outer ring ledge is aligned with the second inner ring ledge;
wherein the plurality of filaments extend between and contact the first outer ring ledge and the first inner ring ledge and extend between and contact the second outer ring ledge and the second inner ring ledge.

11. A rolling bearing comprising:
an outer ring defining an outer ring race;
an inner ring defining an inner ring race, wherein the inner ring is configured to rotate relative to the outer ring;
a plurality of rolling elements, wherein the plurality of rolling elements maintain rolling contact between the outer ring race and the inner ring race;
a cage, wherein the cage is monolithic, wherein the cage defines a plurality of rib portions and a plurality of major-arc portions, wherein the plurality of rib portions join adjacent of the plurality of major-arc portions, wherein the plurality of major-arc portions hold the plurality of rolling elements; and
a plurality of discharge elements, wherein the plurality of discharge elements comprise a plurality of tubes and a plurality of filaments, wherein the plurality of tubes are fixed to the plurality of rib portions, wherein the plurality of tubes are hollow along an entire length, wherein the plurality of tubes bundle the plurality of filaments within the plurality of tubes along the entire length, wherein the plurality of filaments extend radially outward and radially inward from the cage, wherein the plurality of filaments contact the outer ring and the inner ring.

12. The rolling bearing of claim 11, wherein the plurality of rolling elements comprise spherical rolling elements.

13. The rolling bearing of claim 11, wherein the plurality of filaments comprise carbon fiber filaments.

14. The rolling bearing of claim 11, wherein the cage is a plastic cage, wherein the plurality of tubes are fixed within the plurality of rib portions by over-molding the plurality of tubes within the plurality of rib portions.

15. The rolling bearing of claim 11, wherein the plurality of tubes are fixed to the plurality of rib portions at a mid-point of the plurality of rib portions between adjacent of the plurality of major-arc portions.

16. The rolling bearing of claim 11, wherein the plurality of filaments include a continuous length between the outer ring and the inner ring.

17. The rolling bearing of claim 11, wherein the plurality of rolling elements are press-fit into the plurality of major-arc portions.

18. The rolling bearing of claim 11, wherein the outer ring defines a first outer ring ledge and a second outer ring ledge, wherein the outer ring race is disposed between the first outer ring ledge and the second outer ring ledge;
wherein the inner ring defines a first inner ring ledge and a second inner ring ledge, wherein the outer ring race is disposed between the first inner ring ledge and the second inner ring ledge;
wherein the first outer ring ledge is aligned with the first inner ring ledge, wherein the second outer ring ledge is aligned with the second inner ring ledge;
wherein the plurality of filaments extend between and contact the first outer ring ledge and the first inner ring ledge.

19. The rolling bearing of claim 18, wherein the plurality of filaments do not contact the second outer ring ledge and the second inner ring ledge.

20. An electric motor comprising:
a rolling bearing comprising:
an outer ring defining an outer ring race;
an inner ring defining an inner ring race, wherein the inner ring is configured to rotate relative to the outer ring;
a plurality of rolling elements, wherein the plurality of rolling elements maintain rolling contact between the outer ring race and the inner ring race;
a cage comprising a first cage-half and a second cage-half which are joined together, wherein the first cage-half and the second cage-half define a plurality of semi-circle portions and a plurality of rib portions, wherein the plurality of rib portions join adjacent of the plurality of semi-circle portions, wherein the plurality of semi-circle portions hold the plurality of rolling elements; and
a plurality of discharge elements, wherein the plurality of discharge elements comprise a plurality of tubes and a plurality of filaments, wherein the plurality of tubes are fixed to the plurality of semi-circle portions, wherein the plurality of tubes are hollow along an entire length, wherein the plurality of tubes bundle the plurality of filaments within the plurality of tubes along the entire length, wherein the plurality of filaments extend radially outward and radially inward from the cage, wherein the plurality of filaments contact the outer ring and the inner ring;
a rotor, wherein the inner ring is coupled to the rotor; and
a stator, wherein the outer ring is coupled to the stator, wherein the rotor is configured to rotate relative to the stator via the rolling bearing.

* * * * *